(12) United States Patent
Loop et al.

(10) Patent No.: US 8,384,715 B2
(45) Date of Patent: Feb. 26, 2013

(54) VIEW-DEPENDENT RENDERING OF PARAMETRIC SURFACES

(75) Inventors: Charles Loop, Mercer Island, WA (US); Christian Eisenacher, Erlangen (DE); Quirin Meyer, Erlangen (DE)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 12/422,634

(22) Filed: Apr. 13, 2009

(65) Prior Publication Data

US 2010/0259540 A1 Oct. 14, 2010

(51) Int. Cl.
G06T 17/00 (2006.01)
(52) U.S. Cl. .................. 345/420; 345/419
(58) Field of Classification Search ........... 345/419–428
See application file for complete search history.

(56) References Cited

U.S. PATENT DOCUMENTS

| | | | |
|---|---|---|---|
| 6,100,894 A | 8/2000 | Goel | |
| 6,108,006 A | 8/2000 | Hoppe | |
| 7,233,337 B2 | 6/2007 | Lengyel | |
| 2002/0033821 A1 | 3/2002 | Sfarti | |
| 2003/0046617 A1 | 3/2003 | MacPherson | |
| 2007/0018988 A1* | 1/2007 | Guthe | 345/441 |
| 2007/0206008 A1 | 9/2007 | Kaufman | |

OTHER PUBLICATIONS

McAllister et al., Real-Time Rendering of Real Word Environments, Rendering Techniques '99, Proceedings of Eurographics Workshop on Rendering, 1999.*

Catmull, E. E., A subdivision algorithm for computer display of curved surfaces, Doctoral Dissertation, The University of Utah, Dec. 1974.

Chhugani, J., S. Kumar, Budget sampling of parametric surface patches. Proc. of the 2003 Symposium on Interactive 3D Graphics, Apr. 2003, pp. 131-138, Monterey, California, USA.

Clark, J. H., A fast scan-line algorithm for rendering parametric surfaces, Proc. of the 6th Annual Conf. on Comp. Graphics and Interactive Techniques, Aug. 1979, vol. 13, No. 2, ACM New York, NY, USA.

Cook, R. L., L. C. Carpenter, E. E. Catmull, The Reyes image rendering architecture, Computer Graphics, vol. 21, No. 4, Jul. 1987, pp. 95-102.

Gee, K., Introduction to the Direct3D 11 graphics pipeline, Microsoft Corporation, 2008.

Gibson, S., R. J. Hubbold, A perceptually-driven parallel algorithm for efficient radiosity simulation, IEEE Trans. Vis. Comput. Graph., Jul.-Sep. 2000, vol. 6, No. 3, pp. 220-235.

Guan, L., Fang, X., Real-time rendering of large-scale terrain based on levels of detail (LOD)—An implementation with quad-tree structure, UNC-Chapel Hill Comp 281 Computational Geometry Final Project, retrieved Feb. 4, 2009 from http://www.cs.unc.edu/~Iguan/COMP281.files/COMP281FinalReport.htm.

(Continued)

*Primary Examiner* — Xiao M. Wu
*Assistant Examiner* — Charles Tseng
(74) *Attorney, Agent, or Firm* — Lyon & Harr, LLP; Richard T. Lyon

(57) ABSTRACT

Views of parametric surfaces are rendered. A set of parametric surface patches representing a parametric surface being rendered is projected onto a scene, producing a set of view-projected surface patches. Each view-projected surface patch is identified for either culling, subdivision or rendering. For patches which are identified for subdivision, the patches are recursively subdivided into sub-patches until for each sub-patch a prescribed screen-space projection of the sub-patch satisfies a prescribed screen-space error metric. Once the error metric is satisfied, the sub-patch is identified for rendering. Patches and sub-patches which have been identified for rendering are prepared and rendered.

20 Claims, 10 Drawing Sheets

OTHER PUBLICATIONS

Guthe, M., Á. Balázs, R. Klein, GPU-based trimming and tessellation of NURBS and T-Spline surfaces, Proc. of ACM Transactions on Graphics, Jul. 2005, vol. 24, No. 3, pp. 1016-1023.

Ikegami, T., Ninf-G demo at SC08—A distributed PovRay rendering, retrieved Feb. 4, 2009 from http://goc.pragma-grid.net/wiki/index.php/Ninf-G_demo_at_SC08_-_a_distributed_PovRa.

Pajarola, R., Overview of quadtree-based terrain triangulation and visualization, Technical Report UCI-ICS-02-01, Information & Computer Science, University of California Irvine, Jan. 2002.

Patney, A., J. D. Owens, Real-time Reyes-style adaptive surface subdivision, ACM Trans. Graph., Dec. 2008, vol. 27, No. 5.

Rockwood, A. P., K. Heaton, T. Davis, Real-time rendering of trimmed surfaces, Proc. of the 16st Annual Conf. on Comp. Graphics and Interactive Techniques, Jul. 1989, pp. 107-116.

Sengupta, S., M. Harris, Y. Zhang, J. D. Owens, Scan primitives for GPU computing, Proc. of the ACM SIGGRAPH/EUROGRAPHICS Conf. on Graphics Hardware, Aug. 2007, pp. 97-106, San Diego, California, USA.

* cited by examiner

VIEW-DEPENDENT RENDERING OF PARAMETRIC SURFACES

BACKGROUND

In the computer graphics realm a surface of a three-dimensional (3D) object can be mathematically approximated to a prescribed degree of precision by a 3D model of the surface. Such a 3D model commonly includes a collection of vertices in 3D space, where each vertex physically resides at a different location on the object's surface and adjacent pairs of vertices are connected by line segments to form a mesh of polygons. Curved regions of the object's surface are generally represented by a larger number of polygons than flat regions of the object's surface. The 3D model can be created using a variety of different methods. For example, the 3D model can either be created manually, or it can be created automatically by employing a variety of different computer-based tools. A computer-based rendering operation can then be used to convert the 3D model into a two-dimensional image, which can subsequently be either visually displayed or stored.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

View-dependent rendering (VDR) technique embodiments described herein generally involve rendering views of parametric surfaces. In one exemplary embodiment a set of parametric surface patches representing a parametric surface being rendered is projected onto a scene, producing a set of view-projected surface patches. Each view-projected surface patch is identified for either culling, subdivision or rendering. For patches which are identified for subdivision, the patches are recursively subdivided into sub-patches until for each sub-patch a prescribed screen-space projection of the sub-patch satisfies a prescribed screen-space error metric. Once the error metric is satisfied, the sub-patch is identified for rendering. Patches and sub-patches which have been identified for rendering are then prepared and ultimately rendered.

DESCRIPTION OF THE DRAWINGS

The specific features, aspects, and advantages of the view-dependent rendering (VDR) technique embodiments described herein will become better understood with regard to the following description, appended claims, and accompanying drawings where:

DETAILED DESCRIPTION

Figure 1:
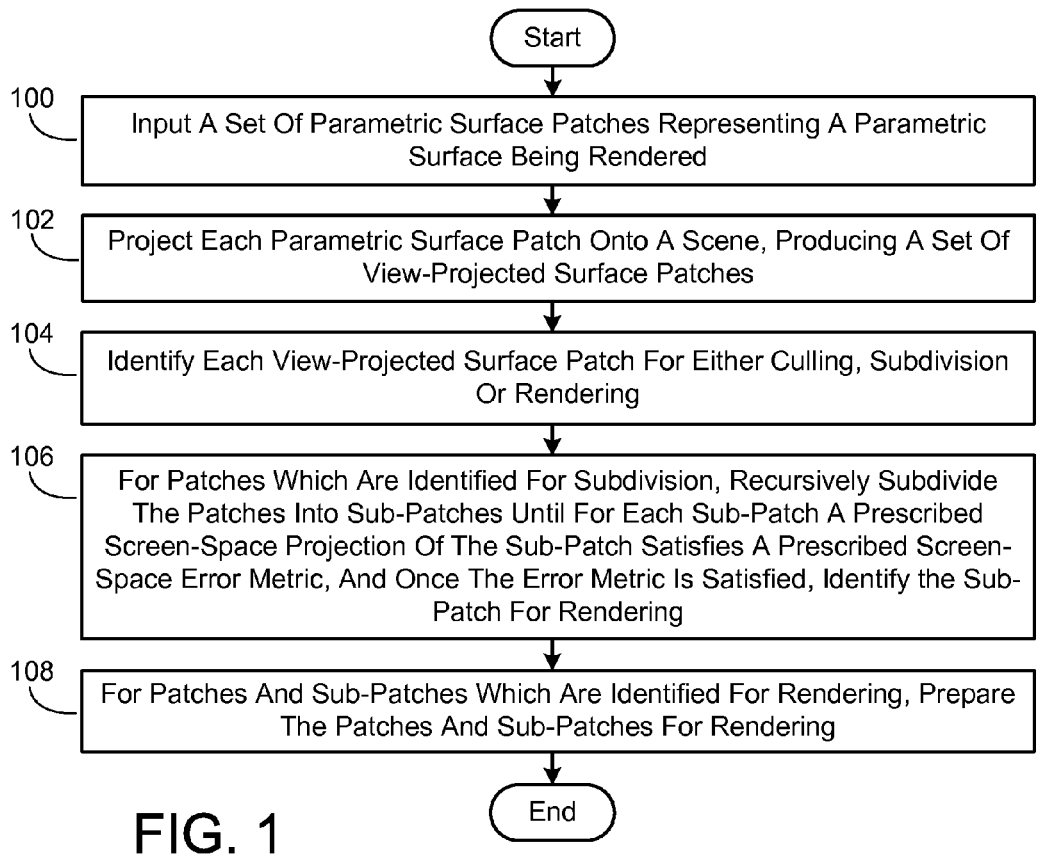
FIG. 1 is a flow diagram illustrating an exemplary embodiment, in simplified form, of a process for preparing a view of a parametric surface for rendering.

In the following description of view-dependent rendering (VDR) technique embodiments reference is made to the accompanying drawings which form a part hereof, and in which are shown, by way of illustration, specific embodiments in which the VDR technique can be practiced. It is understood that other embodiments can be utilized and structural changes can be made without departing from the scope of the VDR technique embodiments.

The term "parametric surface" is used herein to refer to a surface of a three-dimensional (3D) object within an image, where the geometry of the surface can be defined by a parametric equation with two parameters.

1.0 View-Dependent Rendering of Parametric Surfaces

Generally speaking, the VDR technique embodiments described herein involve rendering a view of a parametric surface (hereafter simply referred to as a "surface") by converting a set of parametric surface patches representing the surface into a view-dependent, polygonal approximation of the surface. As will be described in more detail hereafter, this approximation is generated as follows. The set of parametric surface patches is projected onto a scene, producing a set of view-projected surface patches. Each view-projected surface patch is identified for either culling, subdivision or rendering. For patches which are identified for subdivision, the patches are recursively subdivided into sub-patches in an adaptive manner until for each sub-patch a prescribed screen-space projection of the sub-patch satisfies a prescribed screen-space error metric. Once the error metric is satisfied, the sub-patch is identified for rendering. Patches and sub-patches which have been identified for rendering are then prepared and ultimately rendered.

The VDR technique embodiments described herein are advantageous for a variety of reasons including, but not limited to, the following. As will be appreciated from the more detailed description which follows, portions of the VDR technique embodiments can be implemented very efficiently on the parallel processing (also known as single-instruction multiple-threads (SIMT)) architecture of current generation graphics processing unit (GPU) hardware. The VDR technique embodiments will also scale well with future generations of GPU hardware whose architectures are expected to have increasing amounts of parallelism. Thus, the speed at which a view of a parametric surface can be rendered is optimized, even for surfaces which are represented by a large number of surface patches. Generally speaking, the VDR technique embodiments only generate as many surface patches as necessary to faithfully capture the view of the surface so that the number of surface patches generated for a given surface view is minimized. In other words, a larger number of smaller surface patches are generated for regions of the surface view having a more complex geometry (such as those which are highly curved), and a fewer number of larger surface patches are generated for regions of the surface view having a less complex geometry (such as those which are flatter). This serves to further optimize the speed at which a view of a parametric surface can be rendered.

Since the VDR technique embodiments described herein employ a high order representation of the view of the parametric surface well into the rendering pipeline, the polygonal approximation of the surface can be generated "on-the-fly" (as opposed to being generated in an "offline" manner). As such, the VDR technique embodiments can accommodate high frame rates, and serve to minimize the memory footprint, disk space footprint, number of computer processing cycles and memory bandwidth consumed during the rendering operation. The VDR technique embodiments naturally cluster subdivided patches by their parametric surface patch which permits efficient use of the caching functionality provided by conventional GPUs and further minimizes memory bandwidth consumption.

The VDR technique embodiments described herein produce little to no artifacts in the rendered view of the surface. By way of example but not limitation, since the VDR technique embodiments maintain the prescribed screen-space error metric along the parametric surface, silhouettes will be rendered in an smooth and accurate (i.e., artifact-free) manner. The VDR technique embodiments also prevent visible "cracks" in the rendered view of the surface which can be induced by differing subdivision levels between adjacent surface patches (which can result from the adaptive subdivision of the surface patches). The VDR technique embodiments are useful in a wide variety of applications including, but not limited to, the medical industry, the motion picture industry, the video game industry, the building industry, the scientific community and the engineering community.

FIG. 1 illustrates an exemplary embodiment, in simplified form, of a process for preparing a view of a parametric surface for rendering. As exemplified in FIG. 1, the process starts in block 100 by inputting a set of parametric surface patches which represent the parametric surface being rendered. Each parametric surface patch is then projected onto a scene, producing a set of view-projected surface patches (block 102). In an exemplary embodiment of the VDR technique described herein a conventional, composite Model-View-Projection matrix is employed for this projection. Each view-projected surface patch is then identified for either culling, subdivision or rendering (block 104). For patches which are identified for subdivision, the patches are then recursively subdivided into sub-patches until for each sub-patch a prescribed screen-space projection of the sub-patch satisfies a prescribed screen-space error metric, and once the error metric is satisfied, the sub-patch is identified for rendering (block 106). Finally, patches and sub-patches which have been identified for rendering are prepared for rendering (block 108).

Figure 4:
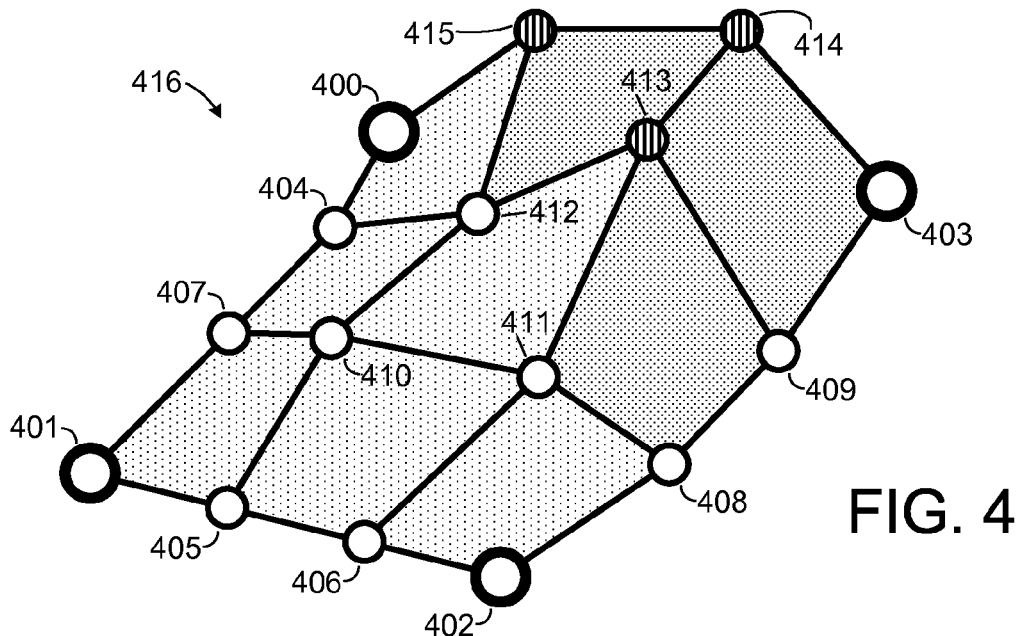
FIG. 4 is a diagram illustrating a perspective view of an exemplary embodiment of a bicubic Bézier patch which can be employed for each parametric surface patch.

In an exemplary embodiment of the VDR technique which is described in more detail hereafter, rational bicubic Bézier patches are employed as the parametric surface patches. As is appreciated in the art of computer graphics, bicubic Bézier patches are popular due to their expressive power (such as their ability to precisely represent surface shapes such as spheres, cones, tori and the like), and their invariance under view-projection mappings. FIG. 4 illustrates a perspective view of an exemplary embodiment of a bicubic Bézier patch. As is appreciated in the art of computer graphics and as exemplified in FIG. 4, a bicubic Bézier patch 416 is a patch of a smooth, continuous surface. The bicubic Bézier patch 416 includes 16 original control points 400-415 which are distributed in a grid arrangement along the surface, where these original control points define the geometry of the surface. The original control points 400-415 are made up of four original corner control points 400-403 and 12 original non-corner control points 403-415.

It is noted that alternate embodiments of the VDR technique are also possible which employ other types of patches for the parametric surface patches. By way of example but not limitation, either arbitrary bidegree tensor product patches or polynomial patches with triangular domains can be employed for the parametric surface patches.

1.1 Subdivision of View-Projected Surface Patches

Figure 2:
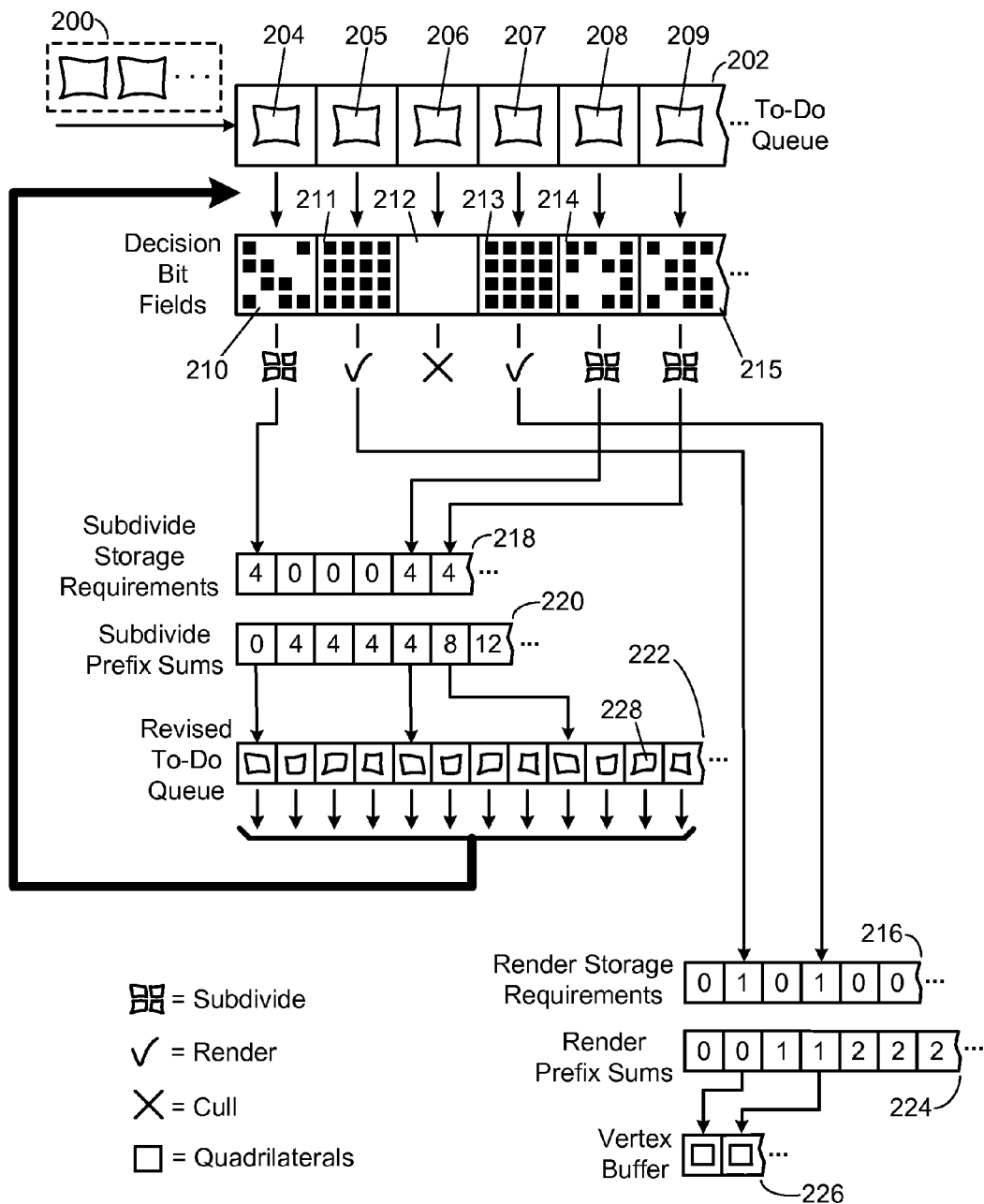
FIG. 2 is a diagram illustrating an exemplary embodiment, in simplified form, of a technique for recursively subdividing a set of view-projected surface patches representing the view of the parametric surface into sub-patches in preparation for rendering.

FIG. 2 illustrates an exemplary embodiment, in simplified form, of a technique for recursively subdividing the aforementioned set of view-projected surface patches into sub-patches in preparation for rendering. As exemplified in FIG. 2, a set of view-projected surface patches 200 is first input into a to-do queue 202. A decision bit-field 210-215 is then computed for each patch 204-209 in the to-do queue 202 using the aforementioned prescribed screen-space error metric. If all of the decision bits in the decision bit-field for a particular patch in the to-do queue 202 are set to zero (as is the case for patch 206 and its corresponding decision bit-field 212), this indicates that the screen-space bounds of a view-projection of the particular patch (i.e., patch 206) are completely outside a viewing frustum (i.e., the particular patch's screen-space bounds are completely "off-screen"). As a result, the particular patch 206 will then be culled.

Referring again to FIG. 2, if all of the decision bits in the decision bit-field for a particular patch in the to-do queue 202 are set to one (as is the case for patches 205 and 207, and their corresponding decision bit-fields 211 and 213), this generally indicates that the particular patch is ready to be rendered. As a result, if the particular patch 205/207 is visible with regard to the view-projection, then the particular patch will be identified for rendering and will be assigned a render storage requirement value 216 of one. If one or more of the decision bits in the decision bit-field for a particular patch in the to-do queue 202 are not set to one (as is the case for patches 204, 208 and 209, and their corresponding decision bit-fields 210, 214 and 215), this generally indicates that the particular patch needs to be subdivided. As a result, the particular patch 204/208/209 will be identified for subdivision and will be assigned a subdivide storage requirement value 218 of four.

Referring again to FIG. 2, once all the patches 204-209 in the to-do queue 202 have been processed in the manner just described, a conventional parallel prefix scan operation is performed on the subdivide storage requirement values 218 for the patches which are identified for subdivision 204/208/209. This results in a series of "subdivide prefix sums" 220 which determine the position within a revised to-do queue 222 for the sub-patches (e.g., 228) resulting from the subdivision of each patch which is identified for subdivision 204/208/209. Similarly, the parallel prefix scan operation is also then performed on the render storage requirement values 216 for the patches which are identified for rendering 205/207. This results in a series of "render prefix sums" 224 which determine the position within a vertex buffer 226 for each patch which is identified for rendering.

As exemplified in FIG. 2, for each patch identified for subdivision 204/208/209, the patch will then be subdivided into four sub-patches (e.g., 228) each of which will be input into the revised to-do queue 222. The revised to-do queue 222 will then be designated as a current to-do queue and the just described technique for computing a decision bit field for each patch in the current to-do queue is repeated using the prescribed screen space error metric. The patches are either culled, rendered or subdivided as appropriate. This continues until no patches remain in the to-do queue. For each patch identified for rendering 205/207, graphics primitives and a prescribed number of quadrilaterals will be generated for the patch and will be input into the vertex buffer 226.

FIGS. 3A-3D illustrate an exemplary embodiment, in simplified form, of a process for performing the aforementioned actions of identifying each view-projected surface patch for either culling, subdivision or rendering, and recursively subdividing the patches which are identified for subdivision into sub-patches until for each sub-patch a prescribed screen-space projection of the sub-patch satisfies a prescribed screen-space error metric. It is noted that these identification and recursive subdivision operations are performed on each view-projected surface patch independently. As such, in the exemplary embodiment which will now be described, each view-projected surface patch is identified and recursively subdivided in a parallel (i.e., concurrent), "breadth-first" manner in order to take full advantage of the aforementioned parallel processing architecture of current generation GPU hardware. This approach generally reduces, by several orders of magnitude, the number of graphics primitives which are computed and the amount of vertex processing which is performed during the aforementioned action of, for patches and sub-patches which are identified for rendering, preparing the patches and sub-patches for rendering. As will be appreciated from the more detailed description which follows, this reduction is due to the fact that graphics primitives are computed and vertex processing is performed only once for each patch and sub-patch which is identified for rendering, and the fact that patches and sub-patches which are not visible in the view-projection are not identified for rendering, among other things. Thus, the speed at which the parametric surface can be rendered is optimized as described heretofore.

Figure 3A:
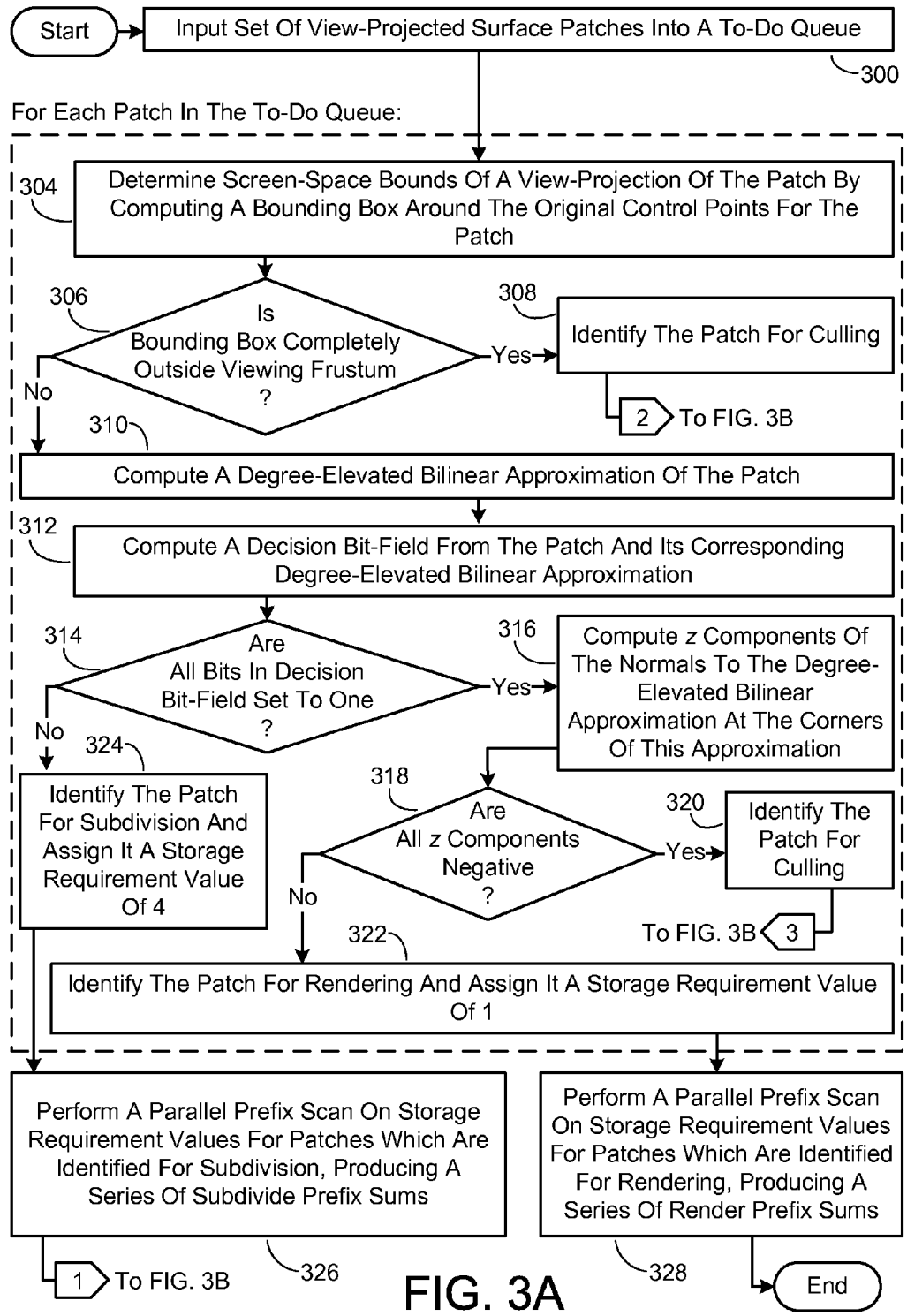
FIGS. 3A-3D are a flow diagram illustrating an exemplary embodiment, in simplified form, of a process for identifying each view-projected surface patch for either culling, subdivision or rendering, and recursively subdividing the patches which are identified for subdivision into sub-patches.

As exemplified in FIG. 3A, the process starts in block 300 by inputting the set of view-projected surface patches into a to-do queue. Each patch in the to-do queue is then processed in a parallel/concurrent manner as follows. The screen-space bounds of a view-projection of the patch are first determined by computing a bounding box around the original control points for the patch (block 304). The bounding box is essentially the smallest possible axes-aligned screen-space rectangle that encompasses the view-projection of the patch. Whenever the bounding box is completely outside a viewing frustum (i.e., it is completely off-screen) (block 306), then a decision bit (which is described in more detail hereafter) for each of the original control points is set to zero and the patch is identified for culling (block 308).

Figure 5:
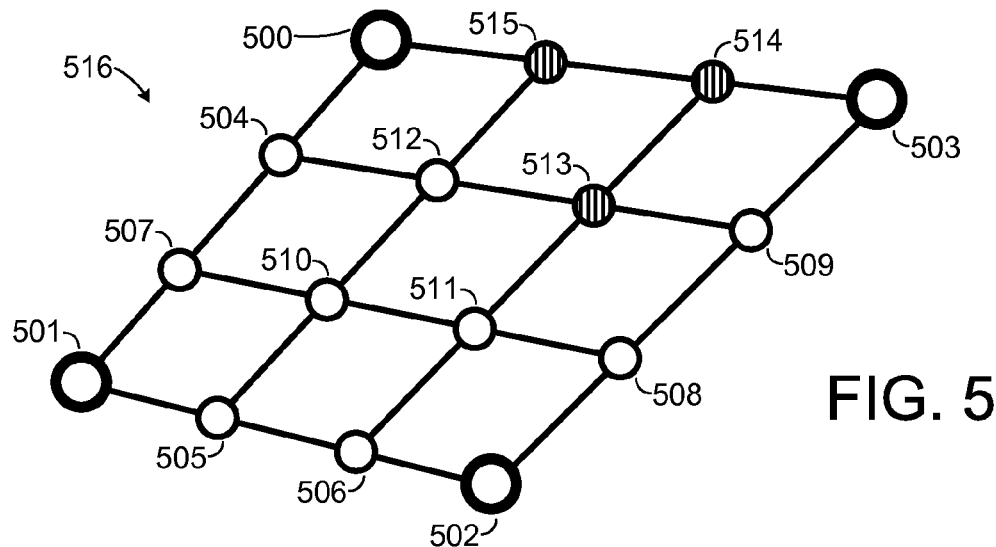
FIG. 5 is a diagram illustrating a perspective view of an exemplary embodiment of a degree-elevated bilinear approximation which is computed from the bicubic Bézier patch exemplified in FIG. 4.

Referring again to FIG. 3A, whenever the bounding box is not completely outside the viewing frustum (i.e., a portion of it is "on-screen") (block 306), then a degree-elevated bilinear approximation of the patch is computed (block 310). As described heretofore, in an exemplary embodiment of the VDR technique rational bicubic Bézier patches are employed for the parametric surface patches. FIG. 5 illustrates a perspective view of an exemplary embodiment of a degree-elevated bilinear approximation which is computed from the bicubic Bézier patch exemplified in FIG. 4. As exemplified in FIG. 5, the degree-elevated bilinear approximation 516 has 16 degree-elevated control points 500-515 each of which is a counterpart to one of the 16 original control points 400-415 for the bicubic Bézier patch 416. The degree-elevated control points 500-515 are made up of four degree-elevated corner control points 500-503 and 12 degree-elevated non-corner control points 504-515. Each of the degree-elevated corner control points 500-503 is set to the same value as its counterpart original corner control point 400-403. In other words, the degree-elevated bilinear approximation 516 is "anchored" to the four corners of its corresponding bicubic Bézier patch 416. Each of the degree-elevated non-corner control points 504-515 is computed by computing a weighted average of the values of the four original corner control points 400-403 for the bicubic Bézier patch, where the weighting is generally based on the distance of the degree-elevated non-corner control point from each of the four original corner control points. In other words, given the four original corner control points 400-403, the degree-elevated non-corner control points 504-515 are computed by various permutations of the weights, where the sum of the weights in each permutation is one (e.g., {2/3,1/3,0,0}, {4/9,2/9,2/9,1/9}, etc.).

Figure 6:
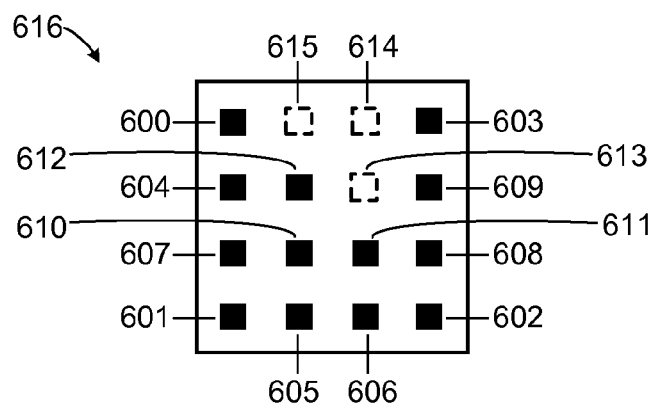
FIG. 6 is a diagram illustrating an exemplary embodiment of a decision bit-field which is computed from the bicubic Bézier patch exemplified in FIG. 4 and its degree-elevated bilinear approximation exemplified in FIG. 5.

Referring again to FIG. 3A, once the degree-elevated bilinear approximation and its associated degree-elevated control points have been computed from the patch in the to-do queue (block 310), a decision bit-field is computed from the patch in the to-do queue and its corresponding degree-elevated bilinear approximation (block 312). FIG. 6 illustrates an exemplary embodiment of a decision bit-field which is computed from the bicubic Bézier patch exemplified in FIG. 4 and its corresponding degree-elevated bilinear approximation exemplified in FIG. 5. As exemplified in FIG. 6, the decision bit-field 616 has 16 decision bits 600-615 where each decision bit corresponds to a different original control point 400-415 for the bicubic Bézier patch 416 (e.g., decision bit 600 corresponds to original corner control point 400, decision bit 601 corresponds to original corner control point 401, and so on). A screen-space distance is computed between each original control point 400-415 for the bicubic Bézier patch 416 and its counterpart degree-elevated control point 500-515 for the degree-elevated bilinear approximation 516. If this distance is less than or equal to the prescribed screen-space error metric, then the corresponding decision bit 600-615 in the decision bit-field 616 is set to one (this is indicated by a shaded square in FIG. 6). If this distance is greater than the prescribed screen-space error metric, then the corresponding decision bit 600-615 in the decision bit-field 616 is set to zero (this is indicated by an un-shaded square in FIG. 6).

Referring again to FIGS. 4-6, it is noted that the four corner decision bits 600-603 will always be set to one since, as described heretofore, the four degree-elevated corner control points 500-503 for the degree-elevated bilinear approximation 516 are the same as the four original corner control points 400-403 for the bicubic Bézier patch 416. Decision bits 604-612 in the exemplary decision bit-field 616 are also set to one since the screen-space distances between original non-corner control points 404-412 for the bicubic Bézier patch 416 and their corresponding degree-elevated non-corner control points 504-512 for the degree-elevated bilinear approximation 516 are less than or equal to the prescribed screen-space error metric. Decision bits 613-615 in the decision bit-field 616 are set to zero since the screen-space distances between original non-corner control points 413-415 for the bicubic Bézier patch 416 and their corresponding degree-elevated non-corner control points 513-515 for the degree-elevated bilinear approximation 516 are greater than the prescribed screen-space error metric.

The screen-space distance and screen-space error metric can be defined in pixel units. In an exemplary embodiment of the VDR technique described herein a screen-space error metric of 0.5 pixels is employed. Alternate embodiments of the VDR technique are also possible which employ other screen-space error metrics. Using a screen-space error metric is advantageous for a variety of reasons including, but not limited to, computational simplicity, rendering accuracy and good fit to current generation GPU hardware.

Referring again to FIG. 3A, once the decision bit-field has been computed (block 312), if all of the decision bits in the decision bit-field are set to one (block 314), then z components of the normals to the degree-elevated bilinear approximation are computed at the corners of this approximation (block 316). If all of the computed z components are negative (block 318), which indicates that the patch in the to-do queue is "back-facing" (i.e., it is not visible) with regard to the view-projection, the patch in the to-do queue will be identified for culling (block 320). This serves to significantly reduce the number of normals that need to be evaluated and the number of graphics primitives that need to be generated in the final rendering stage. If one or more of the computed z components are not negative (block 318), which indicates that the patch in the to-do queue is visible with regard to the view-projection, the patch will be identified for subsequent rendering and a storage requirement value of one will be assigned to the patch (block 322). This storage requirement value of one is an indication that the patch will not be subdivided. If one or more of the decision bits in the decision bit-field are not set to one (block 314), then the patch will be identified for subsequent subdivision and a storage requirement value of four will be assigned to the patch (block 324). This storage requirement value of four is an indication that the patch will be subdivided into four sub-patches as will be described in more detail hereafter.

Figure 3B:
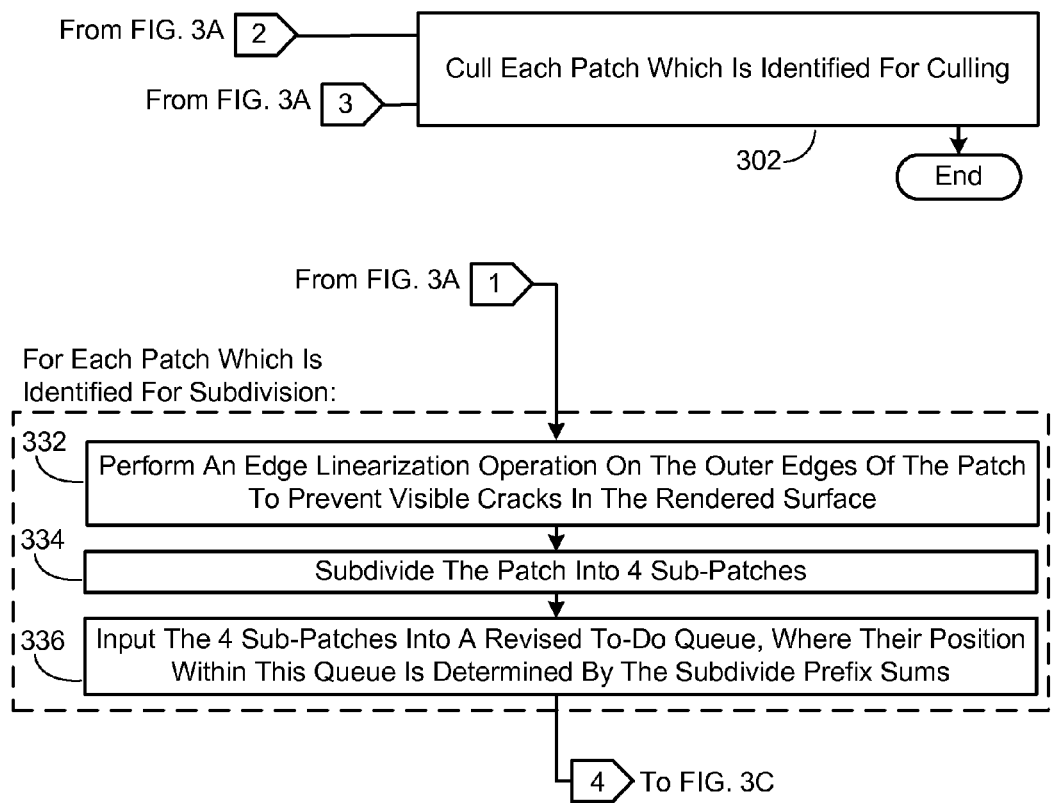

Referring again to FIG. 3A and also referring now to FIG. 3B, once all the patches in the to-do queue have been processed in the manner just described, the following operations are performed. Each patch which is identified for culling is culled (block 302). A conventional parallel prefix scan operation is performed on the storage requirement values for the patches which are identified for subsequent subdivision, producing a series of subdivide prefix sums (block 326). As will be described in more detail hereafter, these subdivide prefix sums determine the position within a revised to-do queue for the sub-patches resulting from the subdivision of each patch which is identified for subdivision. Similarly, the parallel prefix scan operation is also performed on the storage requirement values for the patches which are identified for subsequent rendering, producing a series of render prefix sums (block 328). As will also be described in more detail hereafter, these render prefix sums determine the position within a vertex buffer for each patch which is identified for subsequent rendering.

Referring again to FIG. 3B, each patch which is identified for subdivision can be processed in a parallel/concurrent manner as follows. In order to prevent visible cracks between adjacent patches in the rendered surface, an edge linearization operation is first performed on the outer edges of the patch (block 332). This edge linearization operation is described in more detail hereafter. The patch is then subdivided into four sub-patches (block 334). The four sub-patches are then input into the aforementioned revised to-do queue, where the position of the four sub-patches within this queue is determined by the aforementioned subdivide prefix sums (block 336). It is noted that similar to their parent patch, the four sub-patches each also include 16 original control points which are made up of four original corner control points and 12 original non-corner control points. In an exemplary embodiment of the VDR technique described herein, the patch subdivision is performed as follows. The patch is first subdivided in a latitudinal direction into two initial sub-patches. Each initial sub-patch is then subdivided in a longitudinal direction into two subsequent sub-patches, producing a total of four sub-patches.

Figure 3C:
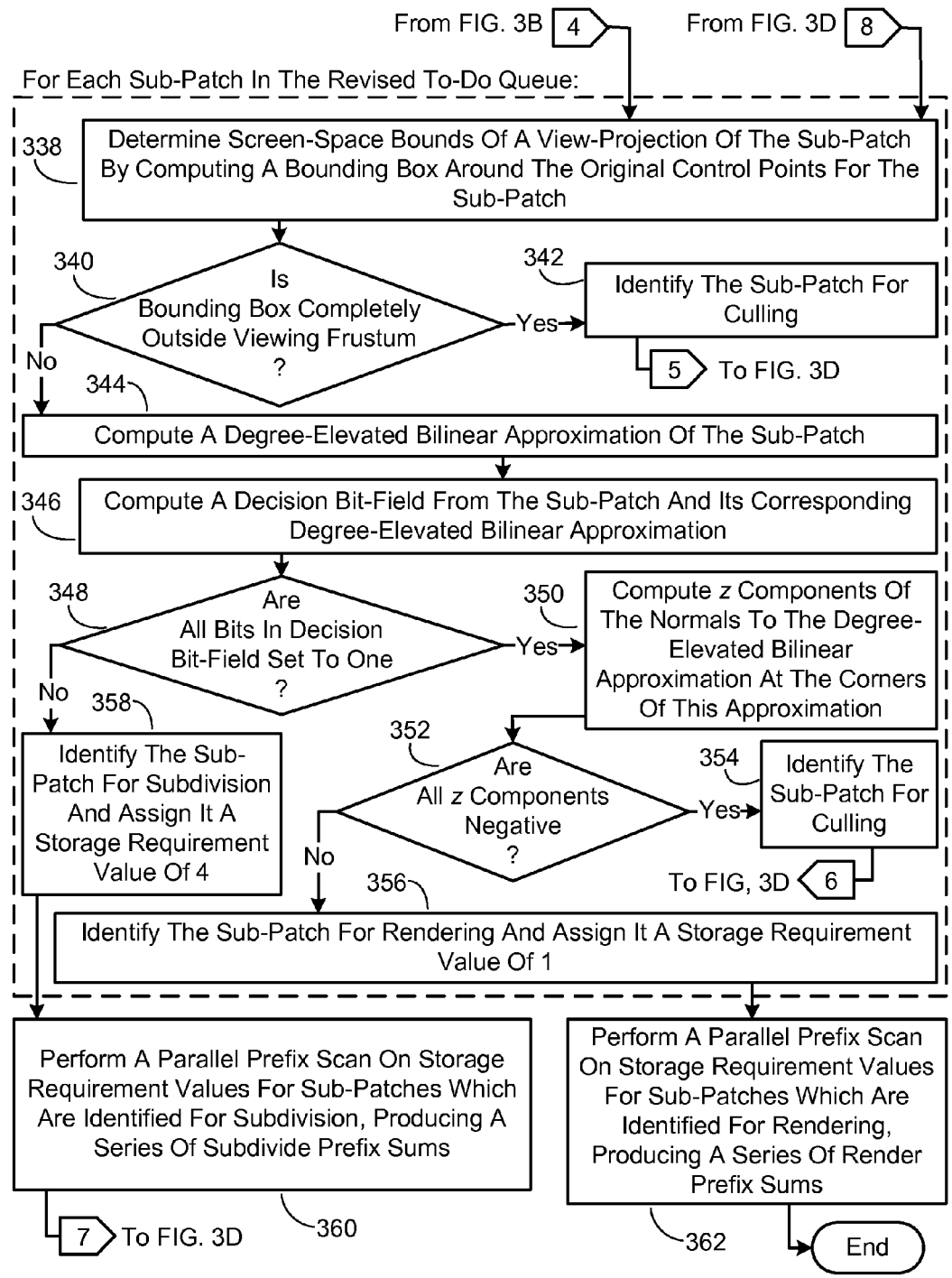

Referring now to FIG. 3C, each sub-patch in the revised to-do queue is processed in a parallel/concurrent manner as follows. The screen-space bounds of a view-projection of the sub-patch are determined by computing a bounding box around the original control points for the sub-patch (block 338). As described heretofore, the bounding box is essentially the smallest possible axes-aligned screen-space rectangle that encompasses the view-projection of the sub-patch. Whenever the bounding box is completely outside the viewing frustum (i.e., it is completely off-screen) (block 340), a decision bit for each of the original control points for the sub-patch is set to zero and the sub patch is identified for culling (block 342). Whenever the bounding box is not completely outside the viewing frustum (i.e., a portion of it is "on-screen") (block 340), a degree-elevated bilinear approximation of the sub-patch is computed (block 344) in the same manner as described heretofore. It is noted that this approximation of the sub-patch has 16 degree-elevated control points each of which is a counterpart to one of the 16 original control points for the sub-patch, where each of the degree-elevated control points is set or computed in the same manner as described heretofore.

Referring again to FIG. 3C, once the degree-elevated bilinear approximation and its associated degree-elevated control points have been computed from the sub-patch in the revised to-do queue (block 344), a decision bit-field is computed from the sub-patch in the revised to-do queue and its corresponding degree-elevated bilinear approximation (block 346). This decision bit-field is computed in the same manner as described heretofore. Whenever all of the decision bits in the decision bit-field are set to one (block 348), z components of the normals to the degree-elevated bilinear approximation of the sub-patch are computed at the corners of this approximation (block 350). If all of the computed z components are negative (block 352), which indicates that the sub-patch in the revised to-do queue is back-facing (i.e., it is not visible) with regard to the view-projection, the sub-patch in the revised to-do queue will be identified for culling (block 354). This serves to further reduce the number of normals that need to be evaluated and the number of graphics primitives that need to be generated in the final rendering stage. If one or more of the computed z components are not negative (block 352), which indicates that the sub-patch in the revised to-do queue is visible with regard to the view-projection, the sub-patch will be identified for subsequent rendering and a storage requirement value of one will be assigned to the sub-patch (block 356). This storage requirement value of one is an indication that the sub-patch will not be subdivided. If one or more of the decision bits in the decision bit-field are not set to one (block 348), then the sub-patch will be identified for subsequent subdivision and a storage requirement value of four will be assigned to the sub-patch (block 358). This storage requirement value of four is an indication that the sub-patch will be subdivided into four sub-patches as described heretofore.

Figure 3D:
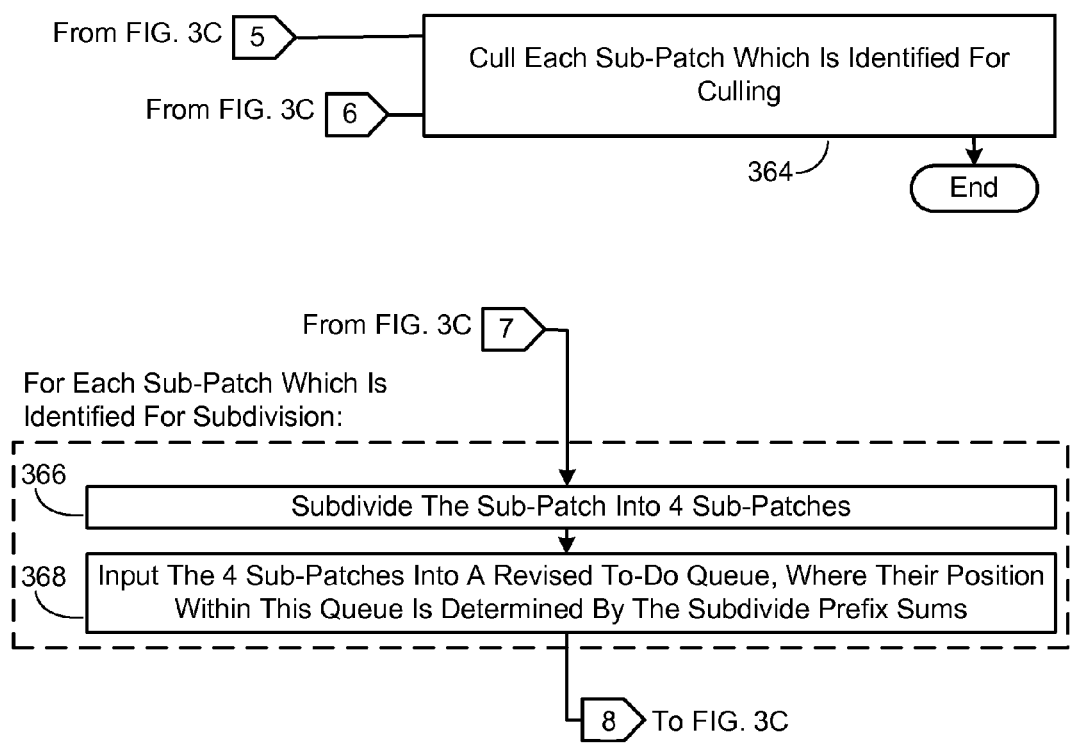

Referring again to FIG. 3C and also referring now to FIG. 3D, once all the sub-patches in the revised to-do queue have been processed in the manner just described, the following operations are performed. Each sub-patch which is identified for culling is culled (block 364). The parallel prefix scan operation is performed on the storage requirement values for the sub-patches which are identified for subsequent subdivision, producing a series of subdivide prefix sums (block 360). As described heretofore, these subdivide prefix sums determine the position within a revised to-do queue for the sub-patches resulting from the subdivision of each sub-patch which is identified for subdivision. Similarly, the parallel prefix scan operation is also performed on the storage requirement values for the sub-patches which are identified for subsequent rendering, producing a series of render prefix sums (block 362). As described heretofore, these render prefix sums determine the position within the vertex buffer for each patch which is identified for subsequent rendering.

Referring again to FIG. 3D, each sub-patch which is identified for subdivision can be processed in a parallel/concurrent manner as follows. The sub-patch is first subdivided into four sub-patches (block 366) in a manner similar to that described heretofore. The four sub-patches are then input into a revised to-do queue, where the position of the four sub-patches within this queue is determined by the subdivide prefix sums (block 368). It is noted that similar to their parent sub-patch, the four sub-patches each also include 16 original control points which are made up of four original corner control points and 12 original non-corner control points. The actions of blocks 338 through 368 are then repeated as appropriate until no sub-patches are identified for subdivision.

Figure 7:
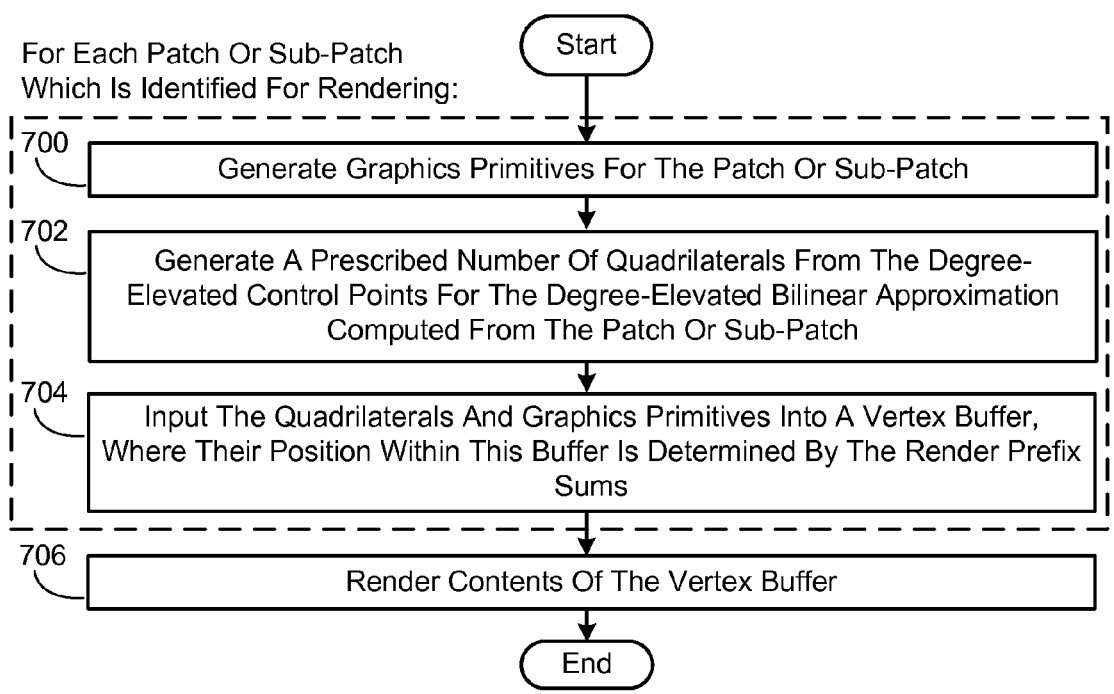
FIG. 7 is a flow diagram illustrating an exemplary embodiment, in simplified form, of a process for rendering the patches and sub-patches which are identified for rendering.

FIG. 7 illustrates an exemplary embodiment, in simplified form, of a process for performing the aforementioned action of, for patches and sub-patches which are identified for rendering, preparing the patches and sub-patches for rendering. As exemplified in FIG. 7, the patches and sub-patches which are identified for rendering can be processed in a parallel/concurrent manner as follows. The process starts in block 700 where graphics primitives are generated for the patch or sub-patch, where this generation includes evaluating a prescribed number of normals to the patch or sub-patch. A prescribed number of quadrilaterals is then generated from the degree-elevated control points for the degree-elevated bilinear approximation which was computed from the patch or sub-patch (block 702). The quadrilaterals and graphics primitives are then input into a vertex buffer, where their position within this buffer is determined by the aforementioned render prefix sums (block 704). The contents of the vertex buffer can then be rendered (block 706) in order to produce a viewable image of the parametric surface which can subsequently be stored and/or displayed.

Referring again to FIG. 7, in one embodiment of the VDR technique the number of normals to each patch or sub-patch identified for rendering which are evaluated in block 700 is 16, and the number of quadrilaterals which are generated for each degree-elevated bilinear approximation computed from the patch or sub-patch in block 702 is nine. For scenes which are very complex, and/or for situations where the memory footprint, number of computer processing cycles and memory bandwidth available to the rendering operation is very limited, another embodiment of the VDR technique is also possible where only four normals to each patch or sub-patch are evaluated in block 700, and only one quadrilateral is generated for each degree-elevated bilinear approximation in block 702.

1.2 Crack Prevention

Figure 12:
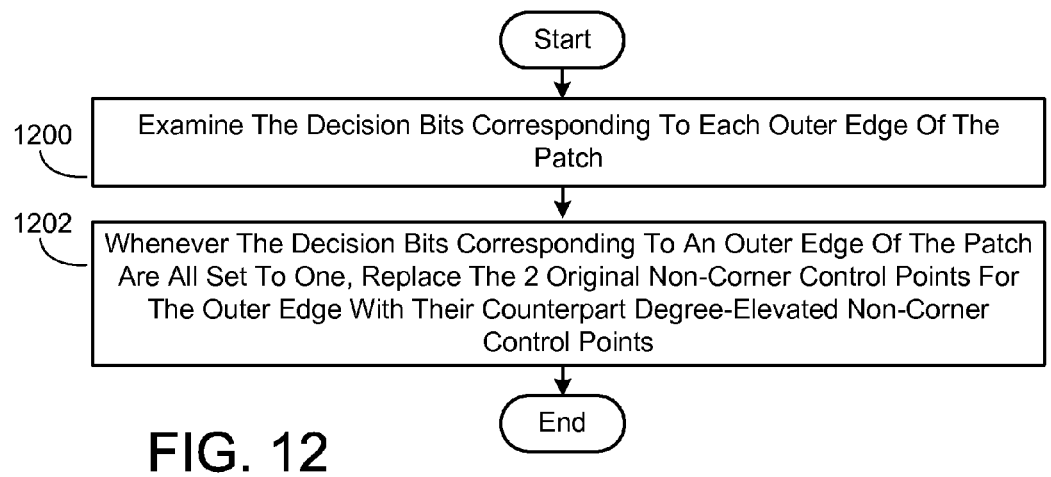
FIG. 12 is a flow diagram illustrating an exemplary embodiment, in simplified form, of a process for performing the edge linearization operation on the outer edges of a surface patch.

FIG. 12 illustrates an exemplary embodiment, in simplified form, of a process for performing the aforementioned edge linearization operation on the outer edges of each patch which is identified for subdivision in order to prevent visible cracks between adjacent patches in the rendered surface. As exemplified in FIG. 12, the process starts in block 1200 by examining the decision bits in the aforementioned decision bit-field corresponding to each outer edge of the patch. Whenever the decision bits corresponding to an outer edge of the patch are all set to one (which indicates that the screen-space projection of the outer edge is within the aforementioned screen-space error metric tolerance of being a straight line), the two original non-corner control points for the outer edge are replaced with their counterpart degree-elevated non-corner control points (block 1202). This control point replacement operation thus turns a curved outer edge of the patch into a straight line edge. Since the decision bits corresponding to a shared edge of two adjacent patches will be set identically when the decision bit-fields for the two adjacent patches are computed, the two adjacent patches will share the new straight line edge. Since further subdivision of either of the two adjacent patches will not deviate from this straight line edge, a crack will not appear between the two adjacent patches when the surface is rendered.

Figure 8:
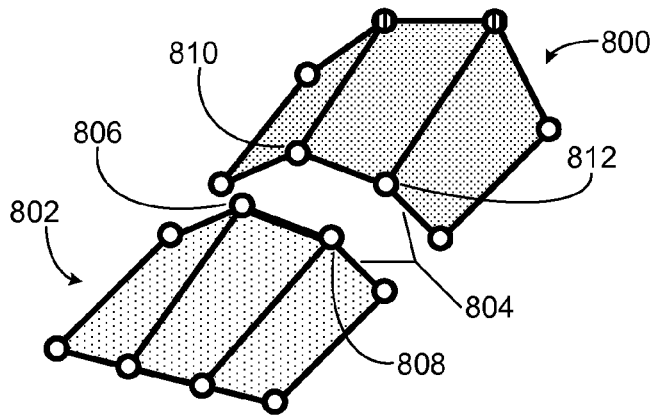
FIG. 8 is a diagram illustrating a perspective view of an exemplary embodiment, in simplified form, of a first surface patch and second surface patch which are adjacent to each other and which share a curved edge.
Figure 9:
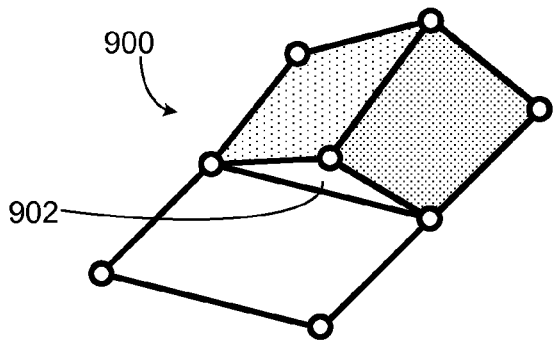
FIG. 9 is a diagram illustrating a perspective view of an exemplary embodiment, in simplified form, of a rendering of the first and second surface patches exemplified in FIG. 8 where a "crack" is visible between the rendered patches.
Figure 10:
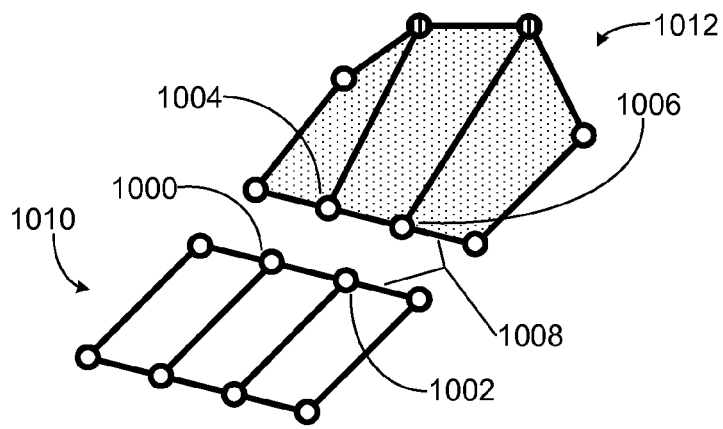
FIG. 10 is a diagram illustrating a perspective view of an exemplary embodiment, in simplified form, of the first and second surface patches exemplified in FIG. 8 after an edge linearization operation has been performed on the outer edges of the surface patches.
Figure 11:
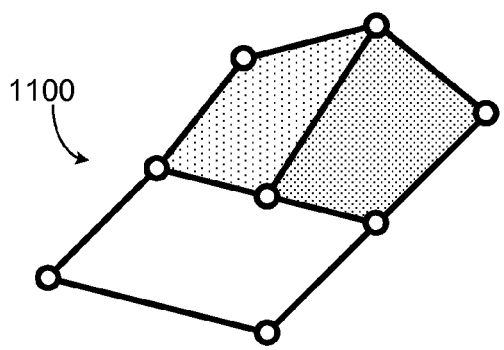
FIG. 11 is a diagram illustrating a perspective view of an exemplary embodiment, in simplified form, of a rendering of the first and second surface patches exemplified in FIG. 10 where the crack exemplified in FIG. 9 has been prevented.

FIG. 8 illustrates a perspective view of an exemplary embodiment, in simplified form, of a first surface patch 800 and second surface patch 802 which are adjacent to each other and which share a curved outer edge 804. FIG. 9 illustrates a perspective view of an exemplary embodiment, in simplified form, of a rendering 900 of the first and second surface patches 800 and 802 where a crack 902 is visible between the rendered patches. As described heretofore, this crack can be induced by differing subdivision levels for the first and second surface patches 800 and 802. FIG. 10 illustrates a perspective view of an exemplary embodiment, in simplified form, of a revised first surface patch 1012 and a revised second surface patch 1010 which are produced when the aforementioned edge linearization operation is performed on the outer edges of the first and second surface patches 800 and 802. As exemplified in FIG. 10, since the two original non-corner control points 810 and 812 for the shared outer edge 804 of the first surface patch 800 are within the screen-space error metric tolerance of being a straight line, the edge linearization operation will replace these two control points with their counterpart degree-elevated non-corner control points 1004 and 1006, producing the revised first surface patch 1012. Similarly, since the two original non-corner control points 806 and 808 for the shared outer edge 804 of the second surface patch 802 are within the screen-space error metric tolerance of being a straight line, the edge linearization operation will replace these two control points with their counterpart degree-elevated non-corner control points 1000 and 1002, producing the revised second surface patch 1010. Thus, the curved outer edge 804 which is shared between the first and second surface patches 800 and 802 has been turned into a straight line edge 1008. FIG. 11 illustrates a perspective view of an exemplary embodiment, in simplified form, of a rendering 1100 of the revised first and second surface patches 1012 and 1010 where the crack 902 exemplified in FIG. 9 has been prevented.

It is noted that the edge linearization operation may not preserve $C^1$ continuity between surface patches, where as is appreciated in the art of mathematics, the term "$C^1$ continuity" generally means that two different functions agree with each other up to a first derivative of the functions. Stated differently, the edge linearization operation may not preserve tangent plane continuity between surface patches. As a result, visible shading discontinuities can occur across patch boundaries in the rendered parametric surface. However, since the VDR technique embodiments described herein keep track of domain coordinates for texture mapping purposes during the aforementioned action of rendering the contents of the vertex buffer, visible shading discontinuities across patch boundaries can be avoided in the rendered parametric surface by evaluating shading normals to each of the parametric surface patches during this rendering action.

2.0 Additional Embodiments

While the VDR technique has been described in more detail by specific reference to embodiments thereof, it is understood that variations and modifications thereof can be made without departing from the true spirit and scope of the VDR technique. By way of example but not limitation, rather than processing the patches in the to-do queue in a parallel/concurrent manner, an alternate embodiment is possible where this processing operation is performed in a serial (i.e., non-concurrent) manner. Rather than processing the patches which are identified for subdivision in a parallel/concurrent manner, another alternate embodiment is possible where this processing operation is performed in a serial manner. Rather than processing the sub-patches in the revised to-do queue in a parallel/concurrent manner, yet another alternate embodiment is possible where this processing operation is performed in a serial manner. Rather than processing the sub-patches which are identified for subdivision in a parallel/concurrent manner, yet another alternate embodiment is possible where this processing operation is performed in a serial manner. Rather than processing the patches and sub-patches which are identified for rendering in a parallel/concurrent manner, yet another alternate embodiment is possible where this processing operation is performed in a serial manner.

It is also noted that any or all of the aforementioned embodiments can be used in any combination desired to form additional hybrid embodiments. Although the VDR technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

This section provides a brief, general description of a suitable computing system environment in which portions of the VDR technique embodiments described herein can be implemented. These VDR technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 13:
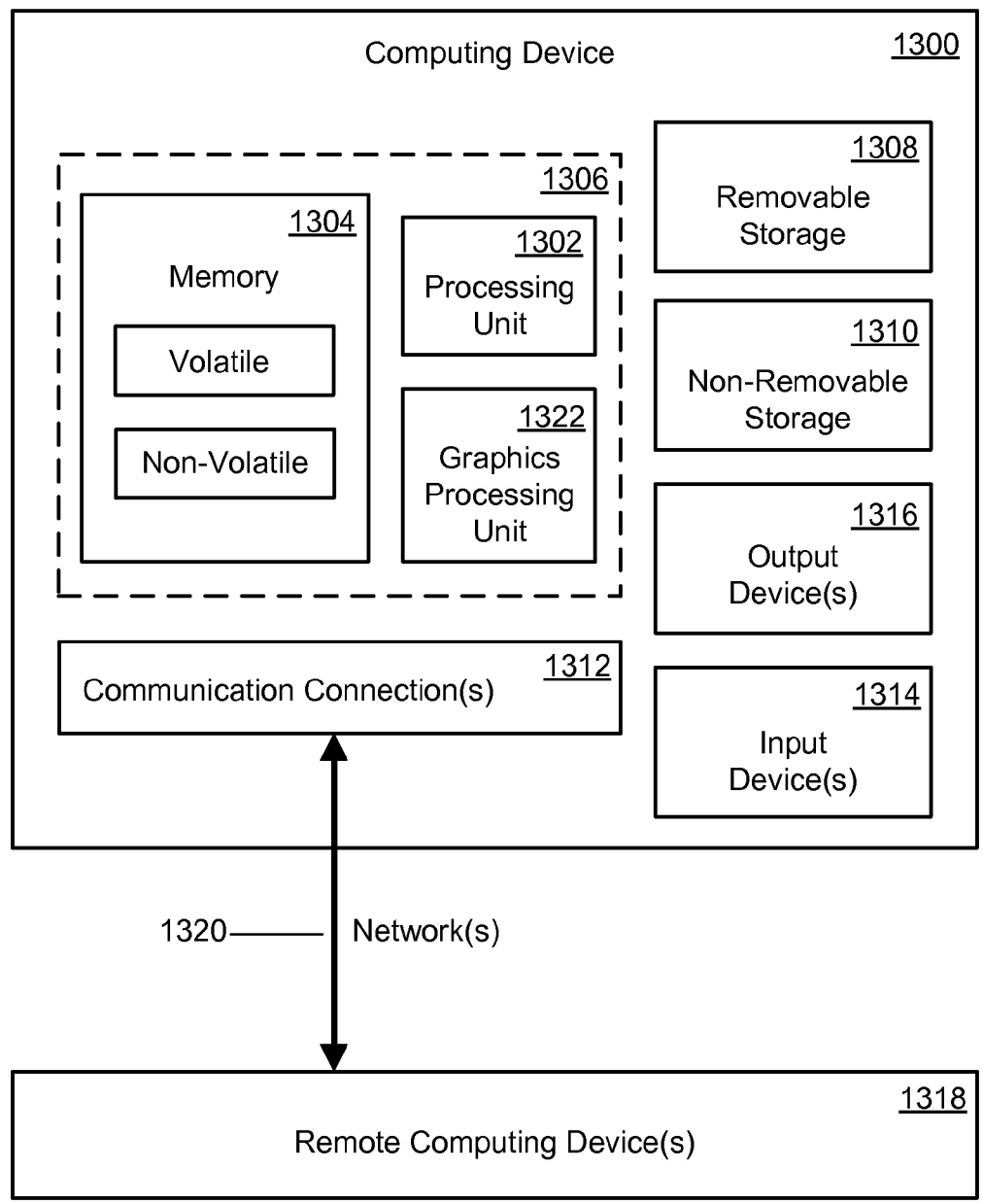
FIG. 13 is a diagram illustrating an exemplary embodiment, in simplified form, of a network-based computing device which constitutes an exemplary system for implementing portions of the VDR technique embodiments described herein.

FIG. 13 illustrates an exemplary embodiment, in simplified form, of a suitable computing system environment according to the VDR technique embodiments described herein. The environment illustrated in FIG. 13 is only one example of a suitable computing system environment and is not intended to suggest any limitation as to the scope of use or functionality of the VDR technique embodiments described herein. Neither should the computing system environment be interpreted as having any dependency or requirement relating to any one or combination of components exemplified in FIG. 13.

As exemplified in FIG. 13, an exemplary system for implementing portions of the VDR technique embodiments described herein includes one or more computing devices, such as computing device 1300. In its simplest configuration, computing device 1300 typically includes at least one processing unit 1302, at least one graphics processing unit (GPU) 1322 and memory 1304. The GPU 1322 has a parallel processing architecture for accelerating graphics rendering and performing other graphics-related functions. Depending on the specific configuration and type of computing device, the memory 1304 can be volatile (such as RAM), non-volatile (such as ROM and flash memory, among others) or some combination of the two. This simplest configuration is illustrated by dashed line 1306.

As exemplified in FIG. 13, computing device 1300 can also have additional features and functionality. By way of example, computing device 1300 can include additional storage such as removable storage 1308 and/or non-removable storage 1310. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 1300 such as computer readable instructions associated with an operating system, application programs and other program modules, and data structures, among other things. Memory 1304, removable storage 1308 and non-removable storage 1310 are all examples of computer storage media. Computer storage media includes, but is not limited to, RAM, ROM, EEPROM, flash memory or other memory technology, CD-ROM, digital versatile disk (DVD) or other optical disk storage technology, magnetic cassettes, magnetic tape, magnetic disk storage or other magnetic storage devices, or any other medium which can be used to store the desired information and which can be accessed by computing device 1300. Any such computer storage media can be part of computing device 1300.

As exemplified in FIG. 13, computing device 1300 can also include one or more communications connections 1312 that allow the device to operate in a networked environment and communicate with one or more remote computing devices 1318. Each remote computing device 1318 can be a PC, a server, a router, a peer device, or other common network node, and typically includes many or all of the elements described herein relative to computing device 1300. Communication between computing devices takes place over one or more networks 1320, each of which provides a logical connection between the computing devices. Each logical connection can include one or more different types of networks including, but not limited to, local area networks (LANs) and wide area networks (WANs). Such networking environments are commonplace in conventional offices, enterprise-wide computer networks, intranets and the Internet. It will be appreciated that the communications connections 1312 and related networks 1320 described herein are exemplary and other means of establishing communication between the computing devices can be used.

As exemplified in FIG. 13, communications connections 1312 and related networks 1320 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared and other wireless media. The term "computer-readable medium" as used herein includes both the aforementioned storage media and communication media.

As exemplified in FIG. 13, computing device 1300 can also include one or more input devices 1314 and one or more output devices 1316. Exemplary input devices 1314 include, but are not limited to, a keyboard, mouse, pen, touch input device, microphone, and camera, among others. A user can enter commands and various types of information into the computing device 1300 through the input devices 1314. Exemplary output devices 1316 include, but are not limited to, one or more display devices, a printer, and audio output devices, among others. These input and output devices are well known and need not be described at length here.

Referring again to FIG. 13, the VDR technique embodiments described herein can be further described and/or implemented in the general context of computer-executable instructions, such as program modules, which are executed by computing device 1300. Generally speaking, program modules include routines, programs, objects, components, and data structures, among other things, that perform particular tasks or implement particular abstract data types. The VDR technique embodiments can also be practiced in a distributed computing environment where tasks are performed by one or more remote computing devices 1318 that are linked through one or more communications networks 1312/1320. In the distributed computing environment, program modules can be located in both local and remote computer storage media including, but not limited to, memory 1304 and storage devices 1308/1310.

Wherefore, what is claimed is:

1. A computer-implemented process for preparing a view of a parametric surface for rendering, comprising
performing the following process actions:
inputting, by a computer, a set of parametric surface patches representing the parametric surface being rendered;
projecting, by the computer, each parametric surface patch onto a scene, producing a set of view-projected surface patches;
identifying, by the computer, each view-projected surface patch for either culling, subdivision, or rendering, said identifying comprising,
inputting the set of view-projected surface patches into a to-do queue, and
for each patch in the to-do queue,
determining the screen-space bounds of the view-projection of the patch by computing a bounding box around the original control points for the patch,
whenever the bounding box is completely outside a viewing frustum, identifying the patch for culling,
whenever the bounding box is not completely outside the viewing frustum,
computing a degree-elevated bilinear approximation of the patch,
computing a decision bit-field comprising a prescribed number of decision bits from the patch and its corresponding degree-elevated bilinear approximation,
whenever all of the decision bits in the decision bit-field are set to one, computing z components of the normals to the degree-elevated bilinear approximation of the patch at the corners of said approximation,
whenever all of the z components are negative, identifying the patch for culling,
whenever one or more of the z components are not negative, identifying the patch for rendering, and
whenever one or more of the decision bits in the decision bit-field are not set to one, identifying the patch for subdivision and assigning the patch a storage requirement value of four;
for patches which are identified for subdivision,
recursively subdividing, by the computer, the patches into sub-patches until for each sub-patch a prescribed screen-space projection of the sub-patch satisfies a prescribed screen-space error metric, and
once said error metric is satisfied, identifying, by the computer, the sub-patch for rendering; and
for patches and sub-patches which are identified for rendering, preparing, by the computer, the patches and sub-patches for rendering.

2. The process of claim 1, wherein the process action of projecting each parametric surface patch onto a scene employs a composite Model-View-Projection matrix.

3. The process of claim 1, wherein the parametric surface patches comprise either arbitrary bidegree tensor product patches or polynomial patches with triangular domains.

4. The process of claim 1, wherein,
the prescribed number of decision bits is 16, and
the parametric surface patches comprise rational bicubic Bézier patches, wherein each bicubic Bézier patch comprises 16 original control points, said 16 original control points comprising four original corner control points and 12 original non-corner control points.

5. The process of claim 4, wherein,
the degree-elevated bilinear approximation of the patch comprises 16 degree-elevated control points each of which is a counterpart to one of the 16 original control points, said 16 degree-elevated control points comprising four degree-elevated corner control points and 12 degree-elevated non-corner control points, and wherein the process action of computing a degree-elevated bilinear approximation of the patch comprises the actions of:
setting each of the degree-elevated corner control points to the same value as its counterpart original corner control point such that the degree-elevated bilinear approximation of the patch is anchored to the four corners of its corresponding bicubic Bézier patch, and computing each of the degree-elevated non-corner control points by computing a weighted average of the values of the four original corner control points, wherein the weighting is based on the distance of the degree-elevated non-corner control point from each of the four original corner control points.

6. The process of claim 5, wherein each decision bit in the decision bit-field corresponds to a different original control point, and wherein the process action of computing a decision bit-field comprises the actions of:

computing a screen-space distance between each original control point and its counterpart degree-elevated control point;

whenever the screen-space distance is less than or equal to the prescribed screen-space error metric, setting the decision bit corresponding to the original control point to one; and whenever the screen-space distance is greater than the prescribed screen-space error metric, setting the decision bit corresponding to the original control point to zero.

7. The process of claim 6, wherein the screen-space error metric is 0.5 pixels.

8. The process of claim 1, further comprising performing after the process action of identifying each view-projected surface patch for either culling, subdivision, or rendering is complete the actions of, performing a parallel prefix scan operation on the storage requirement values for the patches which are identified for subdivision, producing a series of subdivide prefix sums, and culling each patch which is identified for culling.

9. The process of claim 8, wherein the process action of recursively subdividing the patches which are identified for subdivision into sub-patches comprises the actions of:

for each patch, performing an edge linearization operation on the outer edges of the patch, subdividing the patch into four sub-patches, and inputting the four sub-patches into a revised to-do queue, wherein the position of the four sub-patches within said queue is determined by the subdivide prefix sums, and each sub-patch comprises 16 original control points, said 16 original control points comprising four original corner control points and 12 original non-corner control points; and (a) for each sub-patch in the revised to-do queue, determining the screen-space bounds of the view-projection of the sub-patch by computing a bounding box around the original control points for the sub-patch, whenever the bounding box is completely outside the viewing frustum, identifying the sub-patch for culling, whenever the bounding box is not completely outside the viewing frustum, computing a degree-elevated bilinear approximation of the sub-patch, computing a decision bit-field comprising 16 decision bits from the sub-patch and its corresponding degree-elevated bilinear approximation, whenever all of the decision bits in the decision bit-field are set to one, computing z components of the normals to the degree-elevated bilinear approximation of the sub-patch at the corners of said approximation, whenever all of the z components are negative, identifying the sub-patch for culling, whenever one or more of the z components are not negative, identifying the sub-patch for rendering, and whenever one or more of the decision bits in the decision bit-field are not set to one, identifying the sub-patch for subdivision and assigning the sub-patch a storage requirement value of four, (b) once all of the sub-patches in the revised to-do queue have been processed, performing the parallel prefix scan operation on the storage requirement values for the sub-patches which are identified for subdivision, producing a series of subdivide prefix sums, and culling each sub-patch which is identified for culling, and (c) for each sub-patch which is identified for subdivision, subdividing the sub-patch into four sub-patches, inputting the four sub-patches into a revised to-do queue, wherein the position of the four sub-patches within said queue is determined by the subdivide prefix sums, and each sub-patch comprises 16 original control points, said 16 original control points comprising four original corner control points and 12 original non-corner control points, and repeating process actions (a)-(c) until no sub-patches are identified for subdivision.

10. The process of claim 9, wherein the process action of subdividing the patch into four sub-patches comprises the actions of:

subdividing the patch in a latitudinal direction into two initial sub-patches; and subdividing each initial sub-patch in a longitudinal direction into two subsequent sub-patches, producing a total of four sub-patches.

11. The process of claim 9, wherein the process action of performing an edge linearization operation on the outer edges of the patch comprises the actions of:

examining the decision bits corresponding to each outer edge of the patch; and whenever the decision bits corresponding to an outer edge of the patch are all set to one, replacing the two original non-corner control points for the outer edge of the patch with their counterpart degree-elevated non-corner control points.

12. A system for rendering a view of a parametric surface, comprising:

a computing device; and a computer program having program modules executable by the computing device, wherein the computing device is directed by the program modules of the computer program to, input a set of parametric surface patches representing the parametric surface being rendered, project each parametric surface patch onto a scene, producing a set of view-projected surface patches, identify each view-projected surface patch for either culling, subdivision, or rendering, said identifying comprising, inputting the set of view-projected surface patches into a to-do queue, and for each patch in the to-do queue, determining the screen-space bounds of the view-projection of the patch by computing a bounding box around the original control points for the patch, whenever the bounding box is not completely outside a viewing frustum,
computing a degree-elevated bilinear approximation of the patch,
computing a decision bit-field comprising a plurality of decision bits from the patch and its corresponding degree-elevated bilinear approximation,
whenever all of the decision bits in the decision bit-field are set to one, computing z components of the normals to the degree-elevated bilinear approximation of the patch at the corners of said approximation,
whenever one or more of the z components are not negative, identifying the patch for rendering and assigning the patch a storage requirement value of one, and
whenever one or more of the decision bits in the decision bit-field are not set to one, identifying the patch for subdivision and assigning the patch a storage requirement value of four,
cull the patches which are identified for culling,
for patches which are identified for subdivision,
recursively subdivide the patches into sub-patches until for each sub-patch a prescribed screen-space projection of the sub-patch satisfies a prescribed screen-space error metric, and
once said error metric is satisfied, identify the sub-patch for rendering, and
for patches and sub-patches which are identified for rendering, preparing the patches and sub-patches for rendering.

13. The system of claim 12, wherein,
the parametric surface patches comprise a plurality of original control points, said plurality of original control points comprising a first number of original corner control points and a second number of original non-corner control points.

14. The system of claim 13, wherein,
each decision bit in the decision bit-field corresponds to a different original control point,
the degree-elevated bilinear approximation of the patch comprises a plurality of degree-elevated control points the number of which is the same as the number of original control points for the patch, wherein
each degree-elevated control point is a counterpart to one of the original control points, and
the degree-elevated control points comprise,
a plurality of degree-elevated corner control points the number of which is the same as the first number of original corner control points, and
a plurality of degree-elevated non-corner control points the number of which is the same as the second number of original non-corner control points, and wherein
the program module for computing a degree-elevated bilinear approximation of the patch comprises sub-modules for,
setting each of the degree-elevated corner control points to the same value as its counterpart original corner control point such that the degree-elevated bilinear approximation of the patch is anchored to the four corners of the patch, and
computing each of the degree-elevated non-corner control points by computing a weighted average of the values of the four original corner control points, wherein the weighting is based on the distance of the degree-elevated non-corner control point from each of the original corner control points, and wherein
the program module for computing a decision bit-field comprises sub-modules for,
computing a screen-space distance between each original control point and its counterpart degree-elevated control point,
whenever the screen-space distance is less than or equal to the prescribed screen-space error metric, setting the decision bit corresponding to the original control point to one, and
whenever the screen-space distance is greater than the prescribed screen-space error metric, setting the decision bit corresponding to the original control point to zero.

15. The system of claim 14, further comprising program modules for,
once all of the view-projected surface patches have been identified for either culling, subdivision, or rendering,
performing a parallel prefix scan operation on the storage requirement values for the patches which are identified for subdivision, producing a series of subdivide prefix sums, and
performing the parallel prefix scan operation on the storage requirement values for the patches which are identified for rendering, producing a series of render prefix sums, and wherein,
the program module for recursively subdividing in a concurrent manner the patches which are identified for subdivision into sub-patches comprises sub-modules for:
for each patch,
performing an edge linearization operation on the outer edges of the patch,
subdividing the patch into four sub-patches, and
inputting the four sub-patches into a revised to-do queue, wherein the position of the four sub-patches within said queue is determined by the subdivide prefix sums, and each sub-patch comprises a plurality of original control points the number of which is the same as the number of original control points for the patch, said plurality of original control points comprising,
a plurality of original corner control points the number of which is the same as the first number of original corner control points for the patch, and
a plurality of original non-corner control points the number of which is the same as the second number of original non-corner control points for the patch; and
(a) for each sub-patch in the revised to-do queue,
determining the screen-space bounds of the view-projection of the sub-patch by computing a bounding box around the original control points for the sub-patch,
whenever the bounding box is not completely outside the viewing frustum,
computing a degree-elevated bilinear approximation of the sub-patch,
computing a decision bit-field comprising a plurality of decision bits from the sub-patch and its corresponding degree-elevated bilinear approximation,
whenever all of the decision bits in the decision bit-field are set to one, computing z components of the normals to the degree-elevated bilinear approximation of the sub-patch at the corners of said approximation, whenever one or more of the z components are not negative, identifying the sub-patch for rendering and assigning the sub-patch a storage requirement value of one, and whenever one or more of the decision bits in the decision bit-field are not set to one, identifying the sub-patch for subdivision and assigning the sub-patch a storage requirement value of four, (b) once all of the sub-patches in the revised to-do queue have been processed, performing the parallel prefix scan operation on the storage requirement values for the sub-patches which are identified for subdivision, producing a series of subdivide prefix sums, and performing the parallel prefix scan operation on the storage requirement values for the sub-patches which are identified for rendering, producing a series of render prefix sums, and (c) for each sub-patch which is identified for subdivision, subdividing the sub-patch into four sub-patches, inputting the four sub-patches into a revised to-do queue, wherein the position of the four sub-patches within said queue is determined by the subdivide prefix sums, and repeating sub-modules (a)-(c) until no sub-patches are identified for subdivision.

16. The system of claim 15, wherein the program module for preparing the patches and sub-patches for rendering comprises program modules for, for each patch or sub-patch, generating graphics primitives for the patch or sub-patch, said graphics primitives generation comprising evaluating a prescribed number of normals to the patch or sub-patch, generating a prescribed number of quadrilaterals from the degree-elevated control points for the degree-elevated bilinear approximation of the patch or sub-patch, and inputting the graphics primitives and quadrilaterals into a vertex buffer, wherein the position of the graphics primitives and quadrilaterals within said buffer is determined by the render prefix sums.

17. The system of claim 16, wherein the prescribed number of normals is 16 and the prescribed number of quadrilaterals is 9.

18. The system of claim 16, wherein the prescribed number of normals is four and the prescribed number of quadrilaterals is one.

19. The system of claim 16, further comprising a program module for rendering the contents of the vertex buffer, wherein said rendering comprises eliminating visible shading discontinuities across patch boundaries in the rendered view of the parametric surface by evaluating shading normals to each of the parametric surface patches.

20. A computer-implemented process for preparing a view of a parametric surface for rendering, comprising performing the following process actions:

inputting, by a computer, a set of parametric surface patches representing the parametric surface being rendered, wherein the parametric surface patches comprise rational bicubic Bézier patches and each bicubic Bézier patch comprises 16 original control points;

projecting, by the computer, each parametric surface patch onto a scene, producing a set of view-projected surface patches;

identifying, by the computer, in a concurrent manner each view-projected surface patch for either culling, subdivision, or rendering, said identification comprising the actions of, inputting the set of view-projected surface patches into a to-do queue, and for each patch in the to-do queue, determining the screen-space bounds of the view-projection of the patch by computing a bounding box around the original control points for the patch, whenever the bounding box is not completely outside a viewing frustum, computing a degree-elevated bilinear approximation of the patch, computing a decision bit-field from the patch and its corresponding degree-elevated bilinear approximation, wherein the decision bit-field comprises 16 decision bits, whenever all of the decision bits in the decision bit-field are set to one, computing z components of the normals to the degree-elevated bilinear approximation of the patch at the corners of said approximation, whenever one or more of the z components are not negative, identifying the patch for rendering, and whenever one or more of the decision bits in the decision bit-field are not set to one, identifying the patch for subdivision;

culling, by the computer, the patches which are identified for culling;

for patches which are identified for subdivision, recursively subdividing, by the computer, in a concurrent manner the patches into sub-patches until for each sub-patch a prescribed screen-space projection of the sub-patch satisfies a prescribed screen-space error metric, said recursive subdivision comprising the actions of, for each patch, performing an edge linearization operation on the outer edges of the patch, subdividing the patch into four sub-patches, and inputting the four sub-patches into a revised to-do queue, wherein each sub-patch comprises 16 original control points, and (a) for each sub-patch in the revised to-do queue, determining the screen-space bounds of the view-projection of the sub-patch by computing a bounding box around the original control points for the sub-patch, whenever the bounding box is not completely outside the viewing frustum, computing a degree-elevated bilinear approximation of the sub-patch, computing a decision bit-field comprising 16 decision bits from the sub-patch and its corresponding degree-elevated bilinear approximation, whenever all of the decision bits in the decision bit-field are set to one, computing z components of the normals to the degree-elevated bilinear approximation of the sub-patch at the corners of said approximation, whenever one or more of the z components are not negative, identifying the sub-patch for rendering, and whenever one or more of the decision bits in the decision bit-field are not set to one, identifying the sub-patch for subdivision, and (b) for each sub-patch which is identified for subdivision, subdividing the sub-patch into four sub-patches, inputting the four sub-patches into a revised to-do queue, wherein each sub-patch comprises 16 original control points, and repeating process actions (a) and (b) until no sub-patches are identified for subdivision; and for patches and sub-patches which are identified for rendering, preparing, by the computer, the patches and sub-patches for rendering in a concurrent manner.

* * * * *